July 5, 1960  G. L. SMITH  2,943,639
READILY ASSEMBLED CHECK VALVE
Filed Aug. 9, 1956  2 Sheets-Sheet 1

INVENTOR
George L. Smith
BY Ira Milton Jones
Attorney

July 5, 1960 G. L. SMITH 2,943,639
READILY ASSEMBLED CHECK VALVE
Filed Aug. 9, 1956 2 Sheets-Sheet 2

Inventor
George L. Smith

United States Patent Office 2,943,639
Patented July 5, 1960

2,943,639

READILY ASSEMBLED CHECK VALVE

George L. Smith, 4618 W. Carter Place, Milwaukee, Wis.

Filed Aug. 9, 1956, Ser. No. 603,099

2 Claims. (Cl. 137—515.7)

This invention relates to valves and refers more particularly to check valves especially adapted for use in installations requiring frequent sterilization of all parts of the system, as for instance in the handling of liquid milk in dairies and in transport trucks. An example of the latter use may be found in the copending application of George L. Smith, Serial No. 594,813 filed June 29, 1956, now abandoned.

The purpose and object of this invention is to provide a valve which may be readliy disassembled so that all parts thereof can be easily cleaned and sterilized.

More particularly, it is an object of this invention to provide a valve wherein a single coupling nut serves to hold all parts of the valve in assembled relationship so that by simply undoing this one nut all component parts of the valve can be readily separated from one another for cleaning and sterilizing.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come withing the scope of the claims.

Figure 1:
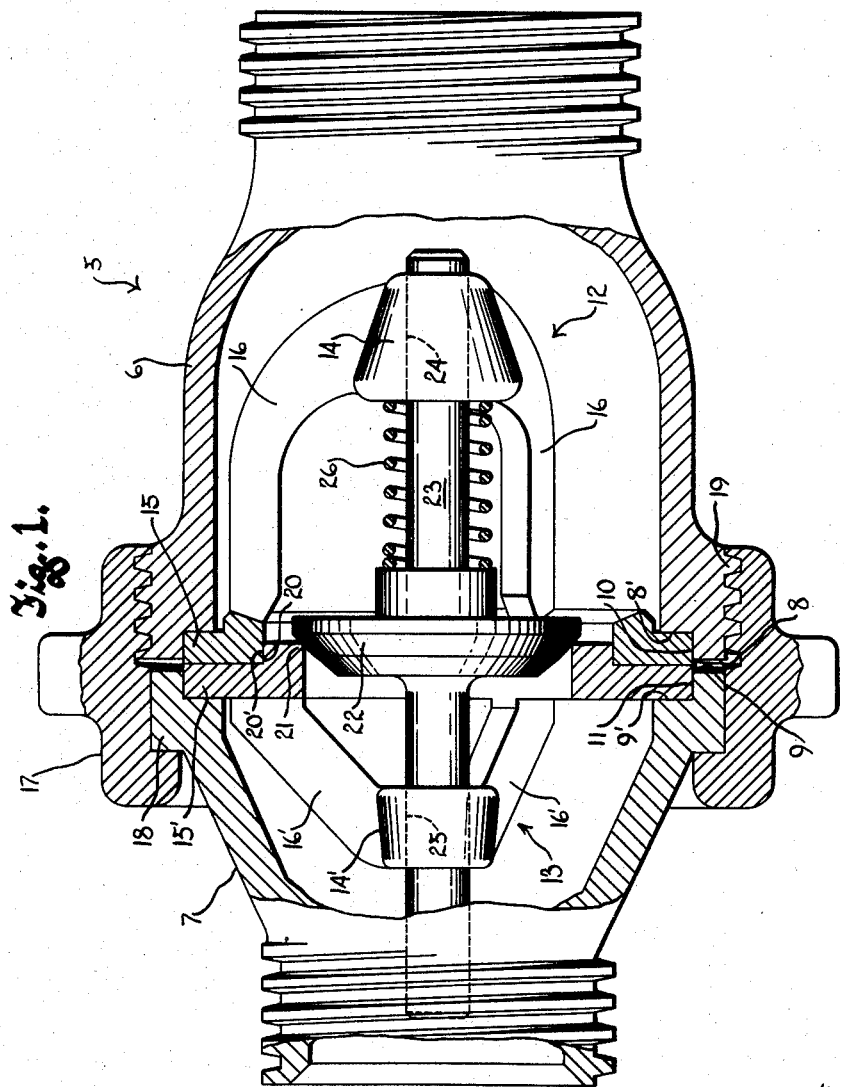
Figure 2:
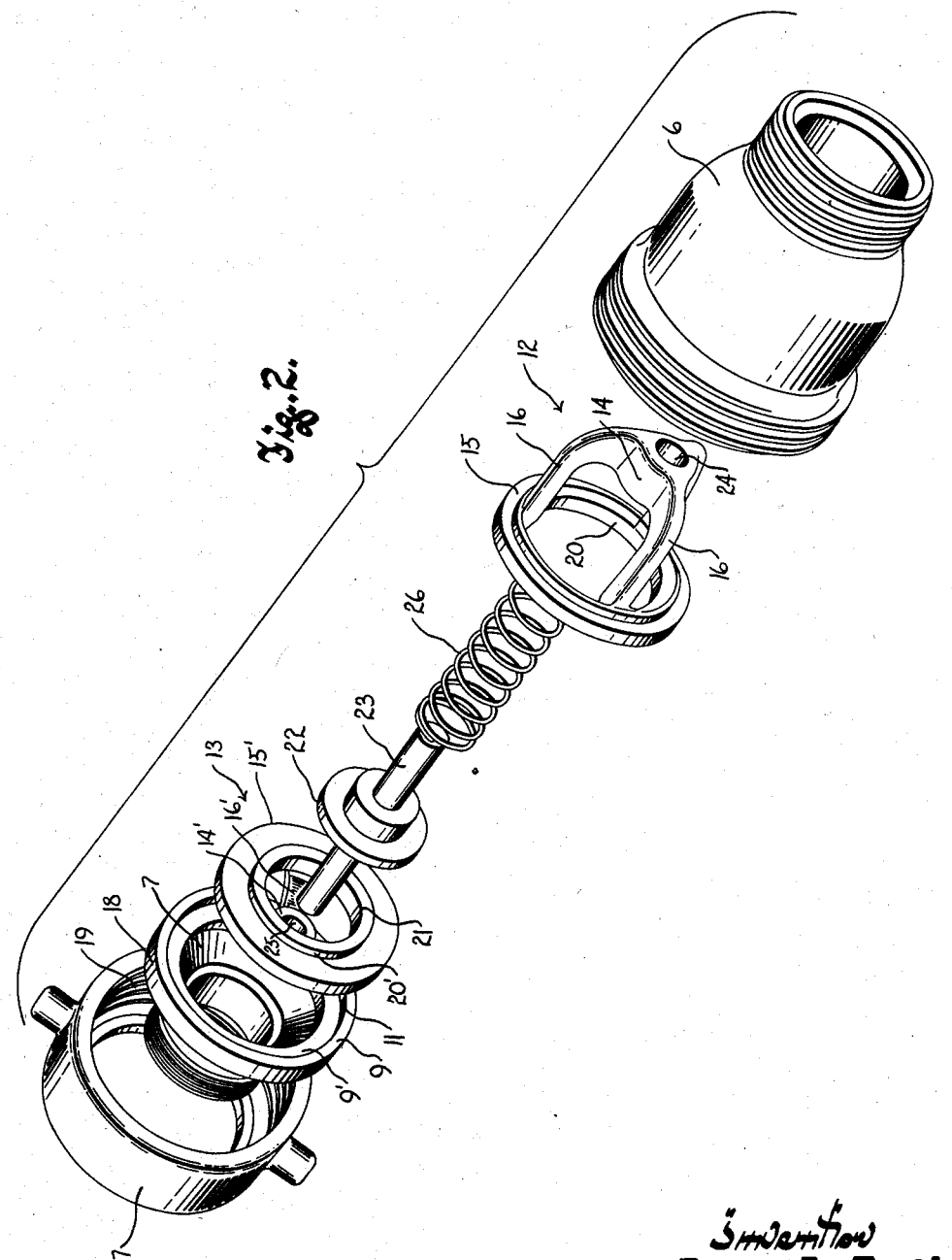

The accompanying drawings illustrate one complete example of the physical embodiment of the invention constructed according to the best mode so far devised for the practical application of the principles thereof, and in which:

Figure 1 is a view partly in longitudinal section and partly in side elevation illustrating the valve of this invention with the parts thereof properly assembled and in operative relationship; and Figure 2 is an exploded perspective view of the component parts of the valve arranged in their proper order of assembly.

Referring now more particularly to the accompanying drawings, in which like numerals designate like parts, the numeral 5 designates generally the body of the valve and which comprises two complementary end-to-end tubular body sections 6 and 7, threaded at their outer ends to enable connection of the valve in a pipe line.

The adjacent ends of the two body sections are of the same diameter, and have opposing outer end faces 8 and 9. Counterbores of the same diameter in the adjacent ends of the body members provide a second set of opposing inner end faces 8' and 9' and aligned cylindrical shoulders 10 and 11.

Within the body 5 are two spiders 12 and 13, the former being within the body section 6 and the latter within the body section 7. These spiders have hubs 14—14' and circular rims 15—15' connected by arms 16—16'. The rims 15—15' have the same outside diameter but slightly smaller than the diameter of the cylindrical shoulders 10 and 11 formed by the sides of the counterbores in the adjacent ends of the body sections so that the rims, seated one upon the other, snugly fit the counterbores to be confined between the inner end faces 8' and 9'.

Attention is directed to the fact that the combined thickness of the two rims 15—15' is greater than the combined depth of the two counterbores so that when parts are assembled as described and shown, the opposing outer end faces 8 and 9 have clearance therebetween. This enables the rims 15—15' to be solidly clamped together to secure the spiders in place by the simple expedient of tightening a coupling nut 17. This nut is removably engaged over a flange 18 on the valve body section 7 and threaded, as at 19, onto the adjacent end of the body section 6.

The rims 15—15' have cooperating centering flanges or abutments 20—20' by which the spiders are held in true coaxiality, independently of the engagement of their rims with the tubular body sections. In fact, the engaging centering shoulders or abutments 20—20' enable the connected rims to be used to center the body sections to one another.

The rim 15' has a valve seat 21 on its inner edge facing the spider 12 and the tubular body section 6 in which the spider 12 is located. A valve disc 22 coacts with the valve seal, and has a valve stem 23 projecting axially therefrom in opposite directions. One end portion of the valve stem is slidably and removably received in a bore 24 in the hub 14 of the spider 12 and the other end portion of the valve stem is slidably and removably recieved in a bore 25 in the hub 14'.

Although the valve disc assumes its seated position by gravity if the valve is mounted in a vertical position with its body section 6 uppermost, a valve spring 26 is preferably provided to yieldingly hold the valve closed. This spring is mounted on the end portion of the valve stem which is received in the hub 14 and is confined between the valve disc and the hub 14.

From the foregoing description taken in connection with the accompanying drawings it will be readily apparent that the valve of this invention can be quickly and easily dismantled so that each individual part thereof may be thoroughly cleaned and sterilized; and that the valve of this invention is so constructed that when its parts are assembled, a sturdy, leak-proof valve is obtained.

What I claim as my invention is:

1. A readily disassembled valve comprising; a pair of tubular body sections having opposing end faces; a pair of spiders, one within each of said body sections, each spider comprising a hub and a circular rim connected to its hub by arms; the rims of the two spiders overlying one another and having coacting annular shoulders interfitting with one another to hold the spiders in coaxial alignment; said overlying rims being received between the opposing end faces on the tubular body sections; the body sections having annular shoulders engaging the peripheral edges of the rims to thereby center the spiders with respect to the tubular body sections; a valve seat on the rim of one of the spiders facing the other spider; a valve disc cooperable with said valve seat; a valve stem projecting axially in opposite directions from said valve disc, the opposite end portions of said valve stem being slidably and removably received in the hubs of the spiders; and a coupling member removably engaged with the flanges on said tubular body sections to draw the same together, detachment of said coupling member enabling complete disassembly of all parts of the valve.

2. The valve of claim 1 further characterized by the provision of a valve spring encircling that end portion of the valve stem which is slidably received in the hub of the spider facing the valve seat; said spring being confined between the valve disc and said hub of the spider to yieldingly hold the valve disc in its seated position.

References Cited in the file of this patent

UNITED STATES PATENTS

| | | |
|---|---|---|
| 383,428 | Messinger | May 22, 1888 |
| 1,616,819 | Norris | Feb. 8, 1927 |
| 2,301,276 | Gussick | Nov. 10, 1942 |
| 2,373,046 | Osborn | Apr. 3, 1945 |